(12) United States Patent
Tombelli

(10) Patent No.: US 11,480,802 B1
(45) Date of Patent: Oct. 25, 2022

(54) ELECTRONIC EYEWEAR FEATURING HINGE CIRCUIT

(71) Applicant: Microsoft Technology Licensing, LLC, Redmond, WA (US)

(72) Inventor: Teresa Elizabeth Tombelli, Palo Alto, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/226,879

(22) Filed: Apr. 9, 2021

(51) Int. Cl.
*G02B 27/01* (2006.01)
*G02C 9/02* (2006.01)
*G02C 11/00* (2006.01)

(52) U.S. Cl.
CPC .......... *G02B 27/0176* (2013.01); *G02C 9/02* (2013.01); *G02C 11/10* (2013.01); *G02B 2027/0178* (2013.01)

(58) Field of Classification Search
CPC ........ G02B 27/0176; G02B 2027/0178; G02C 9/02; G02C 11/10
See application file for complete search history.

(56) References Cited

U.S. PATENT DOCUMENTS

| | | | |
|---|---|---|---|
| 6,424,321 B1 * | 7/2002 | Ronzani | G02B 27/0176 345/87 |
| 2017/0108713 A1 | 4/2017 | Blum et al. | |
| 2019/0198981 A1 * | 6/2019 | Moore | G02C 5/22 |

FOREIGN PATENT DOCUMENTS

| | | | |
|---|---|---|---|
| JP | 2002300247 A | | 10/2002 |
| JP | 2007179940 A | * | 7/2007 |
| JP | 2015522842 A | | 8/2015 |
| JP | 2018189779 A | | 11/2018 |

OTHER PUBLICATIONS

Go, Ray, "File:Hinge of Mobile Phone.jpg", Retrieved From: https://commons.wikimedia.org/wiki/File: Hinge_of_Mobile_Phone.jpg, Sep. 2008, 2 Pages.
"Invitation To Pay Additional Fees Issued in PCT Application No. PCT/US22/021074", date Jun. 23, 2022, 8 Pages.
"International Search Report and Written Opinion Issued in PCT Application No. PCT/US22/021074", dated Aug. 16, 2022, 15 Pages.

* cited by examiner

*Primary Examiner* — Robert J Michaud
(74) *Attorney, Agent, or Firm* — Alleman Hall Creasman & Tuttle LLP

(57) ABSTRACT

An electronic eyewear device includes a frame having a first electronic subsystem that includes a near-eye graphical display, a temple portion having a second electronic subsystem, and a hinge assembly rotatably coupling the frame to the temple portion. According to an example, the hinge assembly includes a hinge core defining a hinge axis, a cover that spans a gap between the frame and the temple portion on at least one side of the hinge axis, and a flexible ribbon circuit electrically coupling the first electronic subsystem to the second electronic subsystem. In at least some examples, the flexible ribbon circuit spirals around the hinge core between the cover and the hinge core.

19 Claims, 7 Drawing Sheets

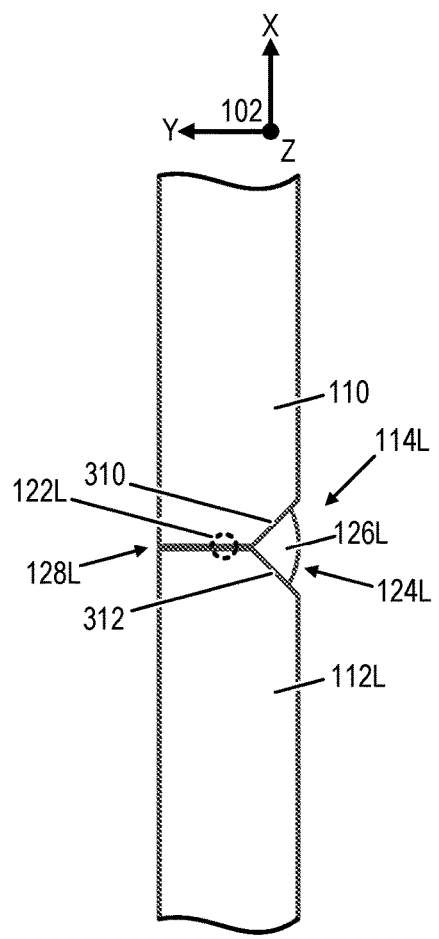
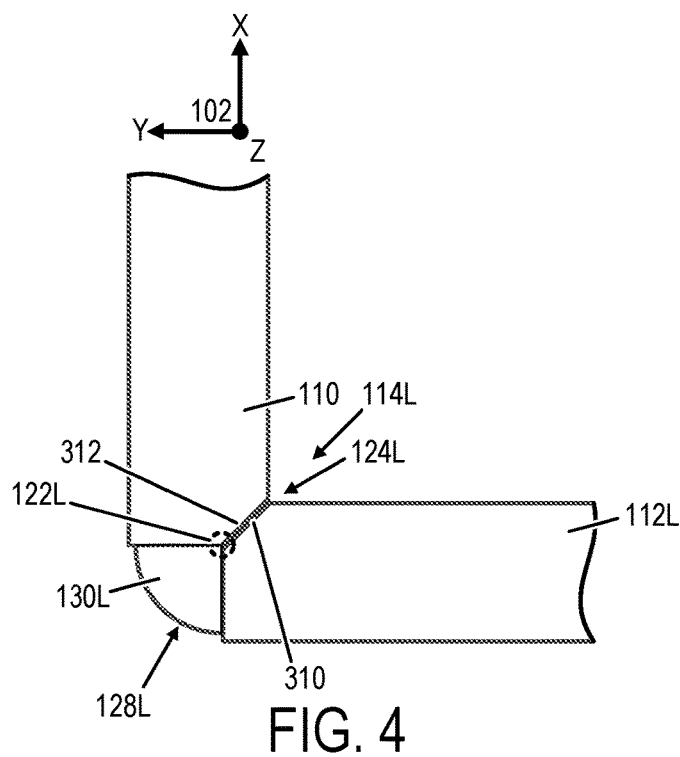
FIG. 3
FIG. 4

ELECTRONIC EYEWEAR FEATURING HINGE CIRCUIT

BACKGROUND

Electronic eyewear, such as augmented reality and virtual reality headsets and glasses, are wearable devices that can display computer generated graphical content via a near-eye display.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples related to electronic eyewear devices are disclosed, wherein the devices include a frame having a first electronic subsystem that includes a near-eye graphical display, a temple portion having a second electronic subsystem, and a hinge assembly rotatably coupling the frame to the temple portion. According to a disclosed example, the hinge assembly includes a hinge core defining a hinge axis, a cover that spans a gap between the frame and the temple portion on at least one side of the hinge axis, and a flexible ribbon circuit electrically coupling the first electronic subsystem to the second electronic subsystem. In at least some examples, the flexible ribbon circuit spirals around the hinge core between the cover and the hinge core. In some examples, a cover assembly is provided that includes an interior-side cover that spans a gap between the frame and the temple portion on a first side of the hinge axis, and an exterior-side cover that spans a gap between the frame and the temple portion on a second side of the hinge axis opposite the first side. The interior-side cover and the exterior-side cover may be rotatable about the hinge axis relative to both the first frame and the temple portion. In some examples, a distal end of the frame and a distal end of the temple portion overlap each other along the hinge axis.

BRIEF DESCRIPTION OF THE DRAWINGS

FIG. 3 shows a detailed view of a hinged interface between the frame and a temple portion of FIG. 1 in which the temple portion is rotated to the open position.

FIG. 4 shows a detailed view of a hinged interface between the frame and a temple portion of FIG. 1 in which the temple portion is rotated to the closed position.

DETAILED DESCRIPTION

Electronic eyewear, such as augmented reality and virtual reality headsets and glasses can incorporate a variety of electronic components. Technological advances have enabled electronic eyewear to resemble traditional forms of eyewear, such as corrective glasses or sunglasses that feature a lens carrying frame having hinged temple portions. However, electrical pathways that traverse hinges between eyewear components have the potential to experience increased strain, degradation, and even failure as a result of repetitive bending. Additionally, hinges can provide locations where contaminants can enter a device enclosure and potentially damage electronic or mechanical components.

Accordingly, an electronic eyewear device is disclosed that may address these problems. Briefly, according to an example, the frame of the electronic eyewear device includes a first electronic subsystem having a near-eye graphical display, and the temple portion includes a second electronic subsystem that can include, for example, a battery, a computing device and/or other suitable components. Each hinge assembly can rotatably couple the frame to one of the temple portions. In at least some examples, the hinge assembly includes a hinge core defining a hinge axis, a cover that spans a gap between the frame and the temple portion on at least one side of the hinge axis, and a flexible ribbon circuit electrically coupling the first electronic subsystem to the second electronic subsystem. In at least some examples, the flexible ribbon circuit spirals around the hinge core between the cover and the hinge core.

The flexible ribbon circuits described herein can each include a plurality of parallel electrical pathways that are configured to carry electrical power and/or electronic signals. As an example, a flexible ribbon circuit may include multiple tens of parallel electrical pathways. The hinge assembly configurations disclosed herein having spiraling flexible ribbon circuits around a hinge core may allow for highly parallelized electrical pathways to be used in a rotatable hinge assembly of a relatively small form factor in a manner that reduces strain on the electrical pathways that may be caused by rotation of the temple portion relative to the frame of an electronic eyewear device. For example, the use of a spiraling electrical pathway within the hinge assembly can serve to increase the overall length of the electrical pathway, which in turn can distribute strain over a greater distance and reduce localized degradation or failure that may result from strain.

Figure 1:
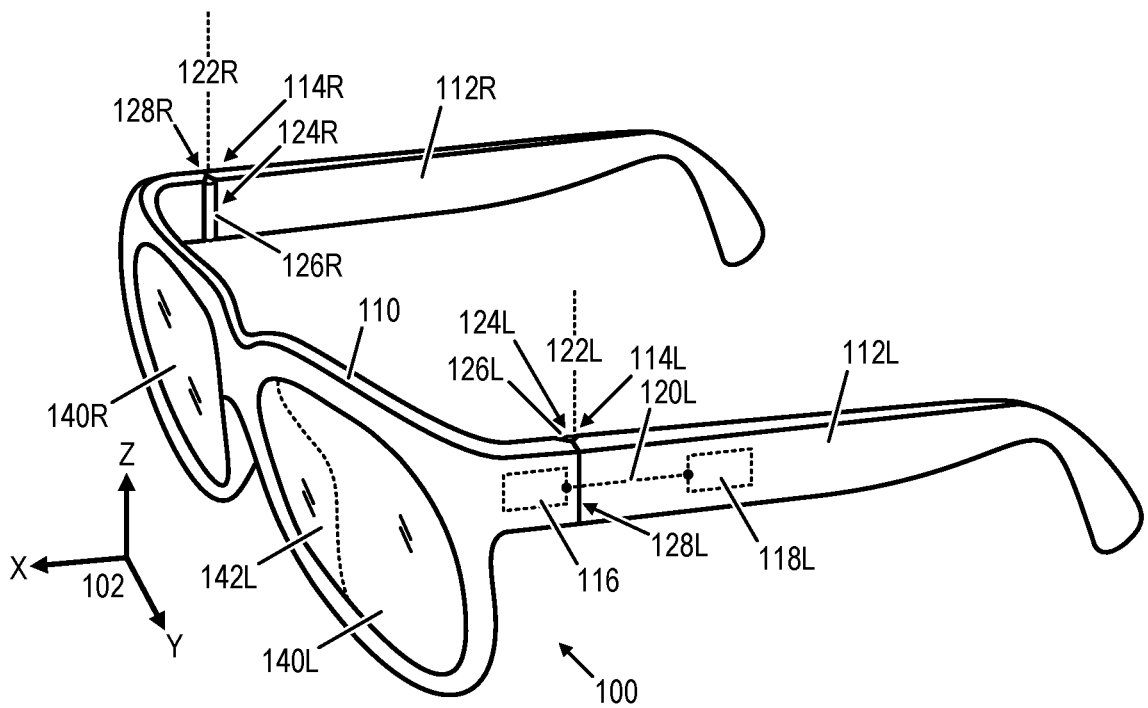
FIG. 1 shows an example electronic eyewear device in which hinged temple portions are in an open position.
Figure 2:
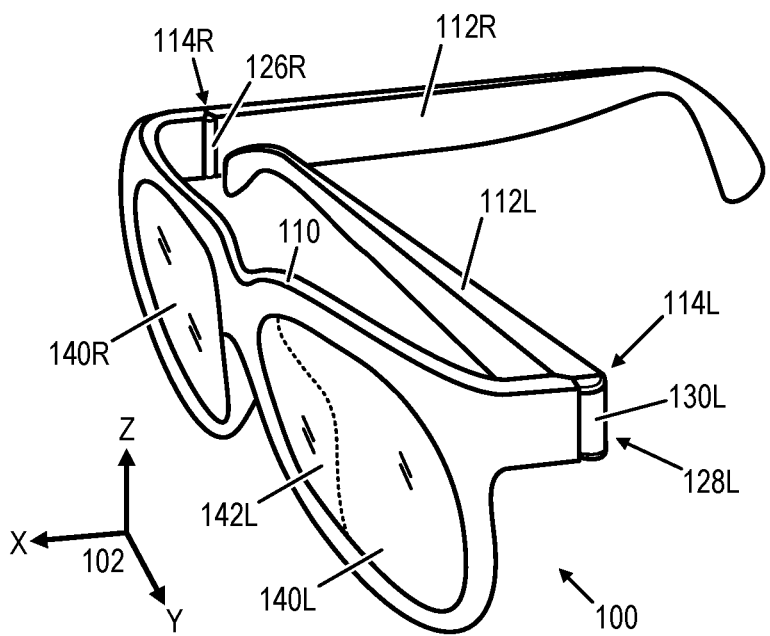
FIG. 2 shows the electronic eyewear device of FIG. 1 in which the left temple portion is rotated to a closed position relative to the frame.

FIG. 1 shows an example electronic eyewear device 100 that includes a frame 110, a right temple portion 112R rotatably coupled to the frame by a right hinge assembly 114R, and a left temple portion 112L rotatably coupled to the frame by a left hinge assembly 114L. Within FIG. 1, right temple portion 112R and left temple portion 112L are in an open position relative to frame 110 as may be worn by a user. FIG. 2 shows electronic eyewear device 100 of FIG. 1 in which the left temple portion 114L is rotated to a closed position relative to frame 112. An example three-dimensional cartesian coordinate system 102 is shown alongside electronic eyewear device 100 in FIGS. 1 and 2 to aid in illustrating spatial relationships with respect to other drawings of the present disclosure.

Referring to FIGS. 1 and 2, frame 110 includes a frame-based electronic subsystem 116, and at least one of right temple portion 112R or left temple portion 112L includes a temple-based electronic subsystem that is electrically coupled to frame-based electronic subsystem 116 by one or more electrical pathways. As depicted schematically in FIG. 1, for example, left temple portion 112L includes a temple-based electronic subsystem 118L that is electrically coupled to frame-based electronic subsystem 116 by one or more electrical pathways 120L. As an example, frame-based electronic subsystem 116 includes one or more near-eye graphical displays, and temple-based electronic subsystem 118L includes a battery and a computing device.

Additionally or alternatively, right temple portion 112R can include a temple-based electronic subsystem that is electrically coupled to frame-based electronic subsystem 116 by one or more electrical pathways. It will be understood that features described with reference to temple-based electronic subsystem 118L of left temple portion 112L and electrical pathways 120L can be similarly used with a temple-based electronic subsystem of right temple portion 112R. Furthermore, it will be understood that electronic subsystems 116 and 118L are depicted schematically in FIG. 1, and that these electronic subsystems can include a plurality of electronic components that are distributed among different locations or regions of electronic eyewear device 110. These electronic components can be located within or mounted upon the frame or the temple portion(s) at various locations or regions.

Electronic eyewear device 100 can include one or more eye pieces. In this example, electronic eyewear device 100 includes independent eye pieces, including right eye piece 140R and left eye piece 140L. In other examples, a unified eye piece can be used for both left and right eyes. Within the context of augmented reality, the eye piece(s) of electronic eyewear device 100 can be transparent or semi-transparent, and graphical content can be displayed by frame-based electronic subsystem 116 on the eye piece(s) to augment the user's view of the real world. For example, within FIGS. 1 and 2, a nose pad 142L of frame 110 is visible through left eye piece 140L. Within the context of virtual reality, the eye piece(s) of electronic eyewear device 100 can be non-transparent and can fully occlude the user's view of the real world. In virtual reality examples, graphical content can be displayed by frame-based electronic subsystem 116 on the eye piece(s) to replace the user's view of the real world with virtual content.

As shown in FIGS. 1 and 2, temple portions 112R and 112L are hinged relative to frame 110 by respective hinge assemblies 114R and 114L. Hinge assembly 114R has a hinge axis 122R, and hinge assembly 114L has a hinge axis 122L. Each hinge assembly may include one or more covers that span gaps between the frame and each temple portion. For example, within FIG. 1, an interior-side cover 124R is visible that spans an interior-side gap 126R between frame 110 and right temple portion 112R in the open position. Similarly, within FIG. 1, an interior-side cover 124L is visible that spans an interior-side gap 126L between frame 110 and left temple portion 112L in the open position. Furthermore, in the open position of FIG. 1, exterior-side gaps 128R and 128L are shown respectively for temple portions 112R and 112L. Within FIG. 2, an exterior-side cover 130L is visible that spans exterior-side gap 128L between frame 110 and left temple portion 112L in the closed position. Right hinge assembly 114R can similarly include an exterior-side cover that spans exterior-side gap 128R.

FIG. 3 shows a detailed view of a hinged interface between frame 110 and temple portion 112L of FIG. 1 in which the temple portion is rotated to the open position relative to the frame. Within FIG. 3, the hinged interface provided by hinge assembly 114L between frame 110 and temple portion 112L is shown as may be viewed along the Z-axis of coordinate system 102. In the open position, interior-side cover 126L spans interior-side gap 124L between frame 110 and temple portion 112L on an interior side of hinge axis 122L. In this example, frame 110 includes a chamfer 310, and left temple portion 112L includes a corresponding chamfer 312. Chamfers 310 and 312 may be configured to interface with each other when left temple portion 112L is rotated to the closed position as shown in FIG. 4.

FIG. 4 shows a detailed view of the hinged interface between frame 110 and temple portion 112L of FIG. 1 in which the temple portion is rotated to the closed position relative to the frame. Within the closed position of FIG. 4, an exterior-side cover 130L is visible spanning exterior-side gap 128L between frame 110 and temple portion 112L on an exterior side of hinge axis 122L. FIG. 4 shows chamfers 310 and 312 interfacing with each other in the closed position.

Figure 5:
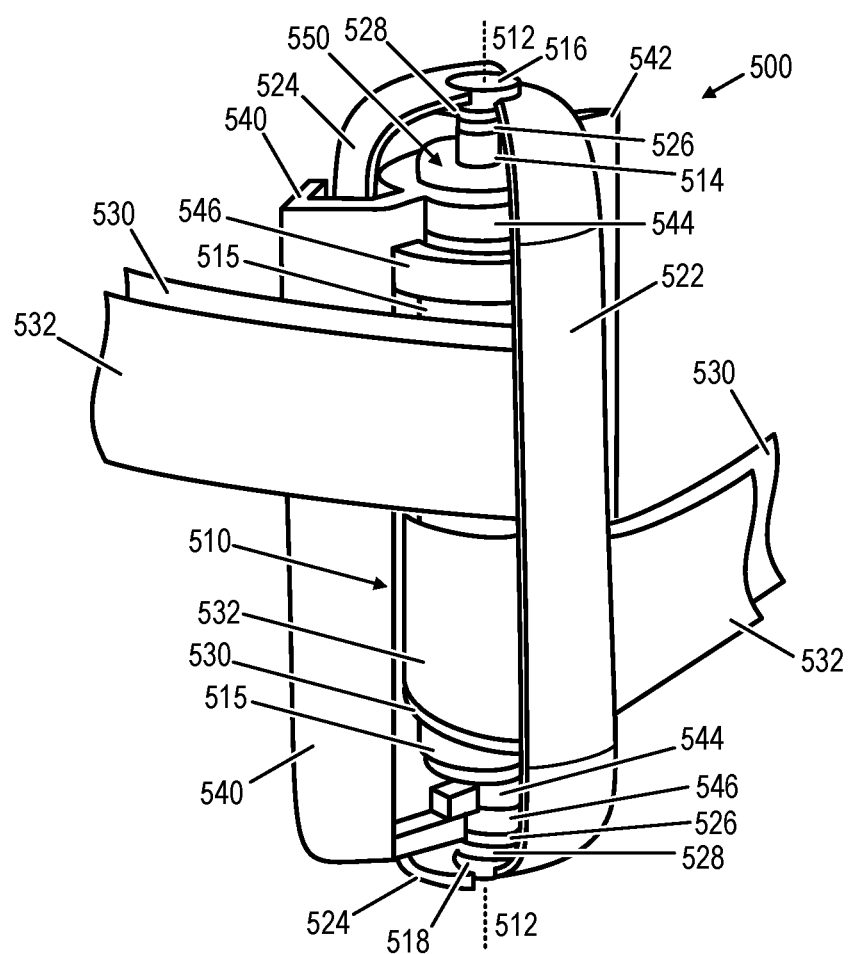
FIG. 5 shows an example hinge assembly that can be used with the electronic eyewear device of FIG. 1.

FIG. 5 shows an example hinge assembly 500 that can be used as hinge assembly 114R or hinge assembly 114L of electronic eyewear device 100 of FIGS. 1-4 to rotatably couple frame 110 to temple portions 112R or 112L. Hinge assembly 500 includes a hinge core 510 defining a hinge axis 512. As an example, hinge core 510 may include a hinge axle 514 that spans the hinge core from a first end cap 516 to a second end cap 518. Hinge core 510 may further include a core body 515 that is mounted on hinge axle 514.

Hinge core 510 further includes a cover assembly that includes an interior-side cover 522 and an exterior side cover 524 that are mounted to hinge core 510, such as via hinge axle 514 or core body 515 that is mounted on the hinge axle. Interior-side cover 522 is an example of interior-side covers 124R and 124L of FIG. 1, and exterior-side cover 524 is an example of exterior-side cover 130L of FIG. 4. In an example, interior side cover 522 may be rotatably coupled to hinge axle 514 by upper and lower retaining clips or collars 526, and exterior side cover 524 may be rotatably coupled to the hinge axle by upper and lower retaining clips or collars 528. In at least some examples, interior-side cover 522 and exterior-side cover 524 may be rotatable about hinge axis 512.

Hinge assembly 500 may further include one or more flexible ribbon circuits 530 and 532, as examples of the one or more electrical pathways 120L of FIG. 1, that may be used to electrically couple a frame-based electronic subsystem (e.g., 116) to a temple-based electronic subsystem (e.g., 118). As an example, one of flexible ribbon circuits 530 or 532 may be configured to convey electrical power from a temple-based electronic subsystem (e.g., 118L) to a frame-based electronic subsystem (e.g., 116), and another of flexible ribbon circuits 530 or 532 may be configured to convey a plurality of electrical signals in parallel between the temple-based electronic subsystem and the frame-based electronic subsystem. Furthermore, in the example of FIG. 5, each of flexible ribbon circuits 530 and 532 spiral around hinge core 510 between one or more of the covers and the hinge core, with flexible ribbon circuit 530 being located between flexible ribbon circuit 532 and hinge core 510. However, in other examples, one or more flexible ribbon circuits or other types of flexible circuits can pass between a cover of the hinge assembly and the hinge core without spiraling or otherwise wrapping around the hinge core.

Hinge assembly 500 further includes a first hinge portion 540, and a second hinge portion 542 that is rotatable relative to first hinge portion 540 about hinge axis 512. As an example, one of hinge portions 540 or 542 interface with the frame (e.g., 110) and another of the hinge portions 540 or 542 interface with the temple portion (e.g., 112L) of the electronic eyewear device. Hinge portion 540 may be mounted to hinge axle 514 or core body 515 of hinge core 510 via upper and lower retaining clips or collars 544, and hinge portion 542 may be mounted to the hinge axle or core body of hinge core 510 via upper and lower retaining clips or collars 546.

Hinge assembly 500 further includes a hinge force mechanism 550 that couples hinge portion 540 to hinge portion 542. In at least some examples, hinge force mechanism 550 defines a varying rotational force profile across a range of rotation of hinge portion 540 relative to hinge portion 542. Further aspects of hinge force mechanism 550 are described with reference to FIGS. 9-11.

Figure 6:
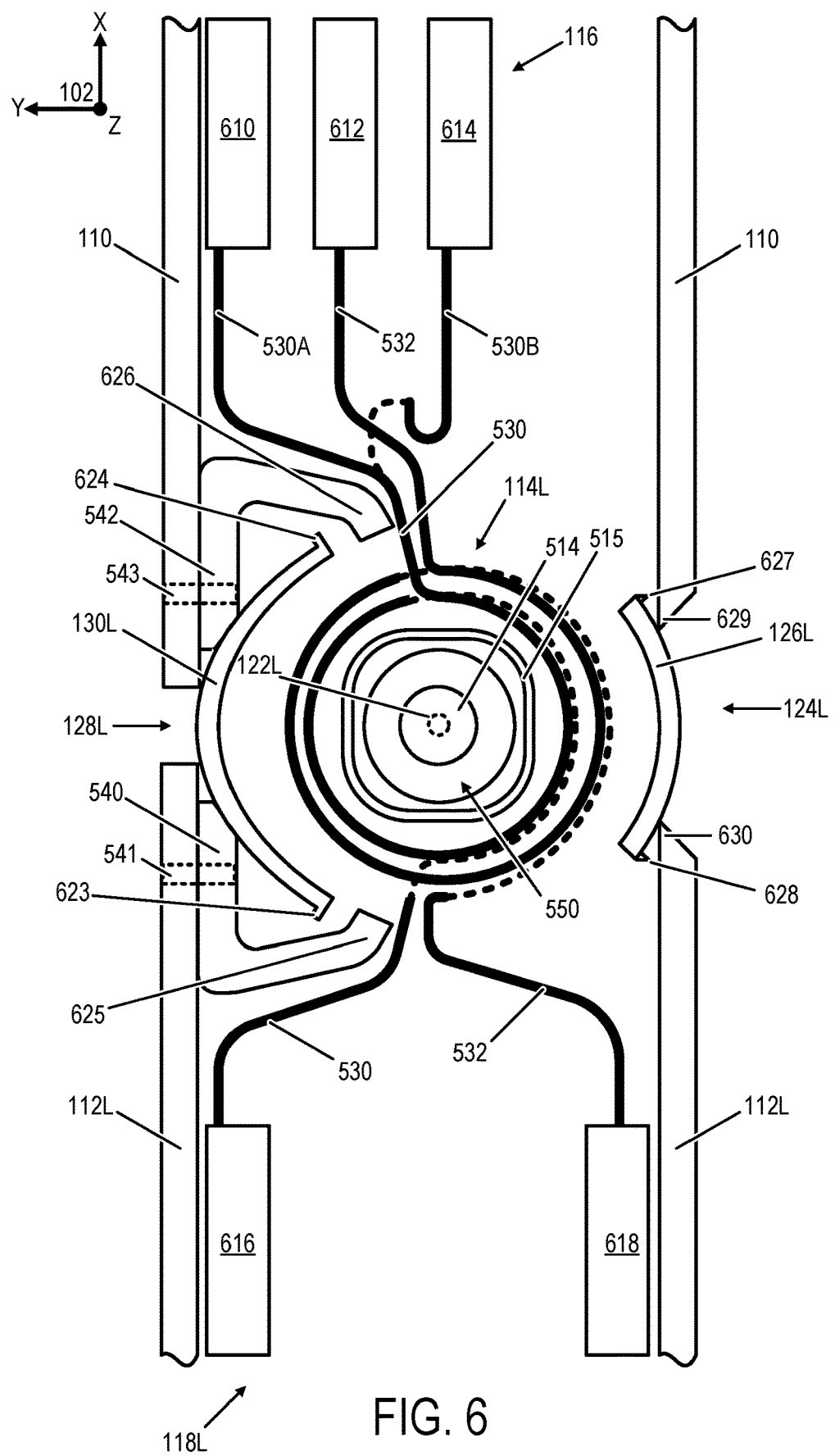
FIG. 6 shows a section view through the electronic eyewear device of FIG. 1 in which the hinge assembly of FIG. 5 is visible.

FIG. 6 shows a section view through electronic eyewear device 100 of FIG. 1 within the X-Y plane of coordinate system 102 in which the hinge assembly 500 of FIG. 5 is used as an example of hinge assembly 114L. Thus, in this example, cover 524 of FIG. 5 is used as cover 130L FIGS. 1-4, and cover 522 of FIG. 5 is used as cover 126L.

Within this example, frame-based electronic subsystem 116 includes electronic components 610, 612, 614, etc., and temple-based electronic subsystem 118L includes electronic components 616, 618, etc. As an example, electronic component 616 takes the form of a battery and associated power conditioning components that provides electrical power to electronic components 610 and 614 via flexible ribbon circuit 530. In this example, flexible ribbon circuit 530 separates into two branches 530A and 530B on the frame side of the hinge assembly. As another example, electronic component 618 takes the form of a computing device that provides a plurality of electrical signals in parallel to electronic component 612 via flexible ribbon circuit 532. One or more of electronic components 610, 612, 614, etc. of frame-based electronic subsystem 116 may include or form part of a near-eye graphical display. Furthermore, within the context of electronic eyewear device 100 of FIG. 1, frame-based electronic subsystem 116 may include a respective near-eye graphical display for each of eye pieces 140R and 140L.

The flexible ribbon circuits described herein can each include a plurality of parallel electrical pathways that are configured to carry electrical power or electronic signals. As an example, a flexible ribbon circuit may include dozens or more parallel electrical pathways. The hinge assembly configurations disclosed herein having spiraling flexible ribbon circuits around a hinge core have the potential to allow for highly parallelized electrical pathways to be used in a rotatable hinge assembly of a relatively small form factor in a manner that reduces strain on the electrical pathways that may be caused by rotation of the temple portion relative to the frame of an electronic eyewear device.

Furthermore, in this example, hinge portions 542 and 540 interface with and are mounted to frame 110 and temple portion 112L, respectively. As an example, hinge portion 540 may be mounted to temple portion 112L via one or more fasteners 640, and hinge portion 542 may be mounted to frame 110 via one or more fasteners 642, represented schematically in FIG. 6.

Within the example of FIG. 6, exterior-side cover 130L of FIG. 2 takes the form of exterior-side cover 524 of FIG. 5, and interior-side cover 124L of FIG. 1 takes the form of interior-side cover 522 of FIG. 5. In at least some examples, interior-side cover 522 and exterior-side cover 524 may be rotatable about hinge axis 512 and/or hinge axle 514 relative to both frame 110 and temple portion 112L. As shown in FIG. 6, exterior-side cover 524 may include two flanges 623 and 624 at opposing edges of the exterior-side cover that are generally parallel to hinge axis 512 and that respectively engage with corresponding flanges 625 and 626 (or other structure) on each of the frame and the temple portion (e.g., on hinge portions 542 and 540 mounted to the frame and temple portion) to limit rotation of the cover within a limited range about the hinge axis. As further shown in FIG. 6, interior-side cover 522 may include two flanges 627 and 628 at opposing edges of the interior-side cover that are generally parallel to hinge axis 512 and that respectively engage with corresponding structures 629 and 630 on each of the frame and the temple portion to limit rotation of the cover within a limited range about the hinge axis.

FIG. 6 further shows an example of the interior-side cover forming a first arc segment that is curved about an axis that is parallel to or colinear with the hinge axis, the exterior-side cover forming a second arc segment that is curved about an axis that is parallel to or colinear with the hinge axis.

Figure 7:
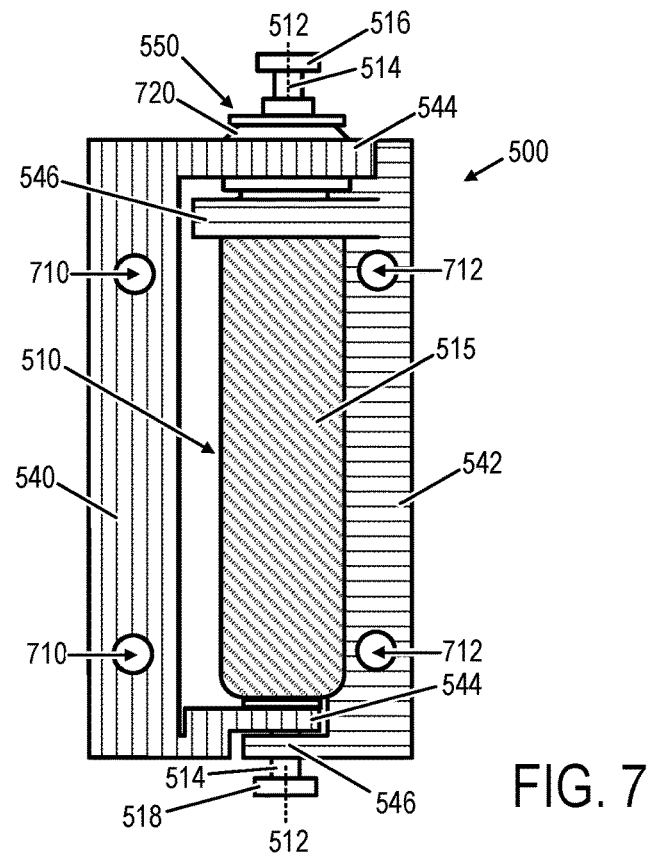
FIGS. 7 and 8 show the hinge assembly of FIG. 5 with the interior-side cover and the exterior-side cover removed to reveal additional features of the hinge assembly.
Figure 8:
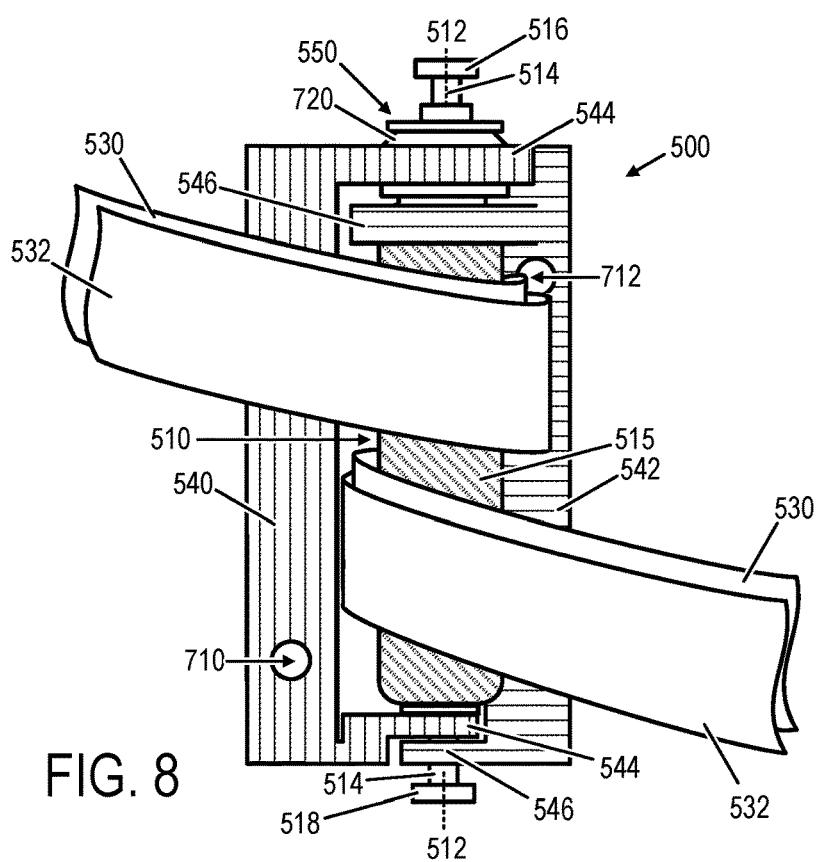

FIGS. 7 and 8 show hinge assembly 500 of FIG. 5 with interior-side cover 522 and exterior-side cover 524 removed to reveal additional features of the hinge assembly. FIG. 7 also shows hinge assembly 500 with flexible ribbon circuits 530 and 532 removed. Within FIGS. 7 and 8, openings 710 are formed in hinge portion 540 that can be used to mount hinge portion 540 to one of a frame or a temple portion (e.g., fasteners 640 or 642 of FIG. 6), and openings 712 are formed in hinge portion 542 that may be used to mount hinge portion 542 to another of the frame or the temple portion (e.g., via fasteners 640 or 642 of FIG. 6). In other examples, hinge portions 540 and 542 may be integrated with one of the frame or a temple portion of the electronic eyewear device.

Furthermore, in this example, hinge force mechanism 550 includes core body 515 and cam 720. Core body 515 interfaces with one of the first hinge portion or the second hinge portion of the hinge assembly. In this example, core body 515 interfaces with hinge portion 542 via upper retaining clip or collar 546. Cam 720 is rotatable relative to core body 515 about hinge axis 512 and hinge axle 514. Cam 720 interfaces with another of the first hinge portion or the second hinge portion relative to core body 515. For example, in FIG. 7, cam 720 interfaces with hinge portion 540 via upper retaining clip or collar 544.

Figure 9:
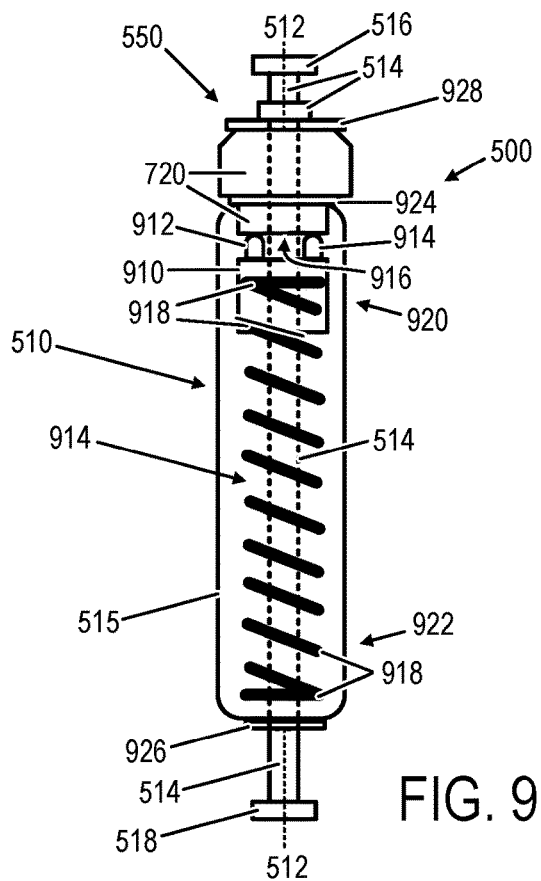
FIG. 9 shows additional components of the hinge force mechanism of the hinge assembly of FIG. 5.

FIG. 9 shows additional components of hinge force mechanism 550 of hinge assembly 500 of FIG. 5. In this example, hinge force mechanism 550 further includes a cam follower 910 that interfaces with cam 720. As an example, cam follower 910 may include one or more followers (e.g., a first follower 912 and a second follower 914) that interface with a cam surface 916 of cam 720. Cam surface 916 is shown schematically in simplified form in FIG. 9. An example cam surface that can be used for cam surface 916 is described in further detail with reference to FIGS. 10 and 11. While cam follower 910 includes two followers in this example, it will be understood that cam follower may include a single follower or three or more followers that interface with cam surface 916 in other examples. Furthermore, in this example, cam 720 and cam follower 910 are both carried upon hinge axle 514 and are rotatable relative to core body 515 about hinge axis 512.

Hinge force mechanism 550 further includes a spring 918 that interfaces with cam follower 910. In this example, spring 918 provides a spring force on cam follower 910 that opposes forces imposed on the cam follower by cam 720. Spring 918 may take various forms, including at least one of a compression spring or a torsion spring. As an example, a first end 920 of spring 918 may be mounted to cam follower 910 and a second end 922 of spring 918 may be mounted to core body 515.

Furthermore, in this example, spring 918, cam follower 910, and a lower portion of cam 720 having cam surface 916 that interfaces with cam follower 910 are housed within an internal region 914 of core body 515. Hinge axle 514 passes through each of spring 918, cam follower 910, and cam 720 between first end cap 516 and second end cap 518, in this example. Movement of core body 515 along hinge axis may be constrained by retainer clips or bushings 924 and 926. Cam 720 may be retained on hinge axle 514 between a retainer clip or bushing 928 and at least one of core body 515 or retainer clip or bushing 924. In other examples, hinge assembly 500 may impart forces (e.g., frictional forces) that resist rotation of the temple portion relative to the frame of the electronic eyewear device without incorporating a cam and cam follower, or without incorporating a spring.

Figure 10:
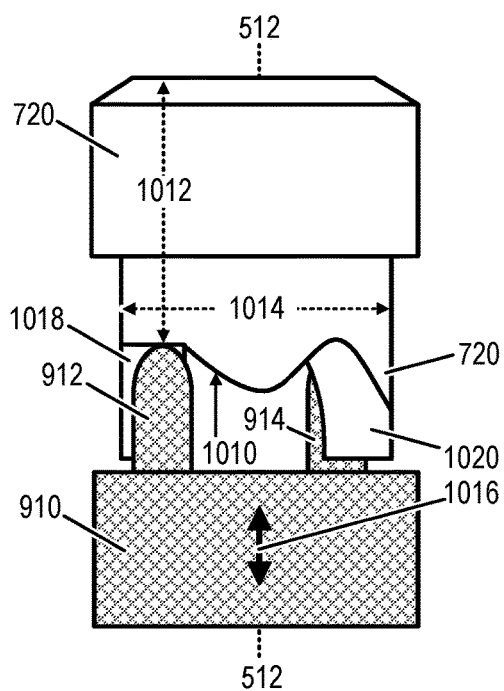
FIGS. 10 and 11 show examples of the cam and cam follower of FIG. 9 in further detail.
Figure 11:
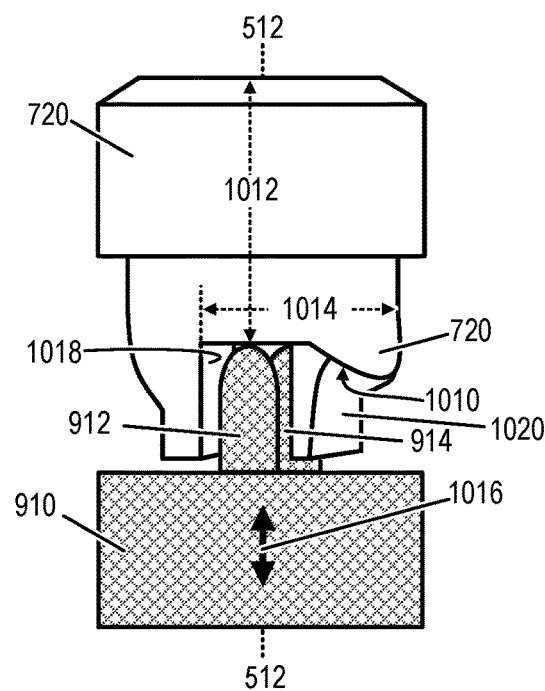

FIGS. 10 and 11 show examples of cam 720 and cam follower 910 of FIG. 9 in further detail. In this example, cam 720 includes a cam surface 1010 that is one example of cam surface 916 of FIG. 9. It will be understood that cam surface 916 may take other suitable shapes or forms to provide a particular force profile across a range of hinge angles.

FIG. 10 shows cam 720 and cam follower 910 having a first angular orientation about hinge axis 512, and FIG. 11 shows cam 720 and cam follower 910 having a second angular orientation about hinge axis 512 that differs from the first angular orientation of FIG. 10. In both FIGS. 10 and 11, cam surface 1010 is shown having a depth 1012 as measured parallel to the hinge axis 512 that varies along a range of rotation 1014 of the cam about the hinge axis. The first follower 912 of cam follower 910 contacts cam surface 1010 at a particular point or region along the cam surface. As follower 912 travels along cam surface 1010 within the range of rotation 1014 of the cam, a displacement 1016 of cam follower 910 as measured along hinge axis 512 similarly varies according to the shape of the cam surface at the point or region of contact of follower 912. In this example, a portion of cam surface 1010 that is traveled by follower 912 terminates at a first hard stop 1018 and at a second hard stop 1020 that define opposing ends of the range of rotation 1014 to inhibit travel of follower 910 beyond the range of rotation.

With the use of two followers 912 and 914, range of rotation 1012 may correspond to 180 degrees or less about hinge axis 512. For example, cam surface 1010 may have an identical or similar shape on an opposite side of hinge axis 512 from the portion of cam surface 1010 that is depicted in FIGS. 10 and 11 that is followed by follower 914. The use of separate followers 912 and 914 on opposite sides of hinge axis 512 may provide a balancing of forces that reduces tilting of either cam follower 910 or cam 720 relative to hinge axis 512. In another example, three or more followers may be used that are located at equal radial coordinates from each other about hinge axis 512. For example, three followers may be located at 120 degree spacing about hinge axis 512, and cam surface 1010 may support a range of rotation of 120 degrees or less between hard stops for each follower.

Cam 720 in combination with cam follower 910 and spring 912 of hinge force mechanism 550 may provide a variable rotational force profile. This variable rotational force profile can be non-linear or linear across the range of rotation. As an example, the hinge force mechanism can be configured by cam profile selection (i.e., a shape of the cam surface that is followed by the cam follower) so that the rotational force profile provides a resistive rotational force within a first part of the range of rotation in a first direction, and provides a decreasing rotational force or an assistive rotational force within a second part of the range of rotation in the first direction. The rotational force profile can provide opposite forces when rotated in the opposite direction to the first direction. The steeper the slope of the upper cam profile, the more the spring is compressed per a given angular rotation, resulting in increased torque needed to rotate the temple portion relative to the frame via the hinge.

As an illustrative example, cam 720 can limit (e.g., by hard stop 1018 or 1020) the range of rotation to allow for the temple portion to hyperextend up to a threshold angle relative to the frame (e.g., up to 15 degrees) beyond the open position depicted in FIGS. 1 and 3. As another example, cam 720 can limit the range of rotation (e.g., by another of hard stop 1018 or 1020) to allow for the temple portion to rotate up to threshold angle (e.g., 90 degrees) relative to the frame in the closed position. It will be understood that other suitable angles and ranges of rotation may be used.

Figure 12:
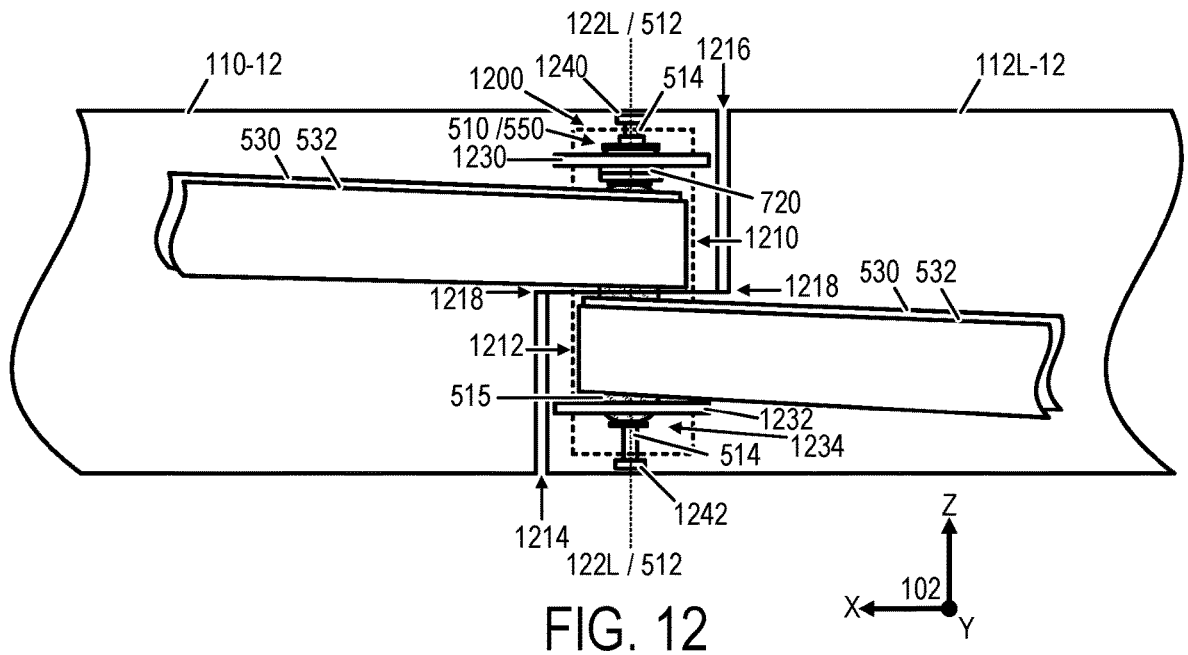
FIGS. 12 and 13 show another example hinge assembly that can be used with an electronic eyewear device.
Figure 13:
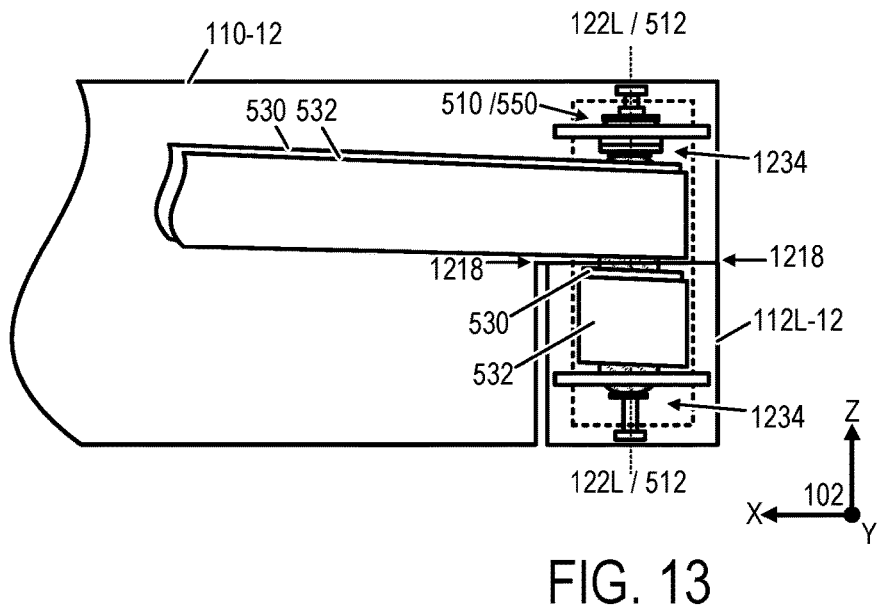

FIGS. 12 and 13 show another example hinge assembly 1200 that can be used with an electronic eyewear device. As an example, the electronic eyewear device can refer to device 100 of FIG. 1 that has a modified hinged interface in which a distal end 1210 of the frame (represented in FIGS. 12 and 13 by frame 110-12) and a distal end 1212 of the temple portion (represented in FIGS. 12 and 13 by temple portion 114L-12) overlap each other along hinge axis 122L.

FIG. 12 shows frame 110-12 and temple portion 114L-12 of the electronic eyewear device in an open position. In the open position of FIG. 12, both the frame and the temple portion have a stepped profile formed by vertical gaps 1214 and 1216, and horizontal interface 1218 as viewed within the XZ plane along the Y-axis. FIG. 13 shows frame 110-12 and temple portion 114L-12 of the electronic eyewear device in a closed position in which temple portion 114L-12 is rotated partially behind frame 110-12 along the Y-axis.

In this example, hinge assembly 1200 rotatably couples frame 110-12 to temple portion 114L-12 about hinge axis 122L using hinge core 510 and hinge force mechanism 550 of previously described hinge core 500 of FIG. 5. For example, hinge core 510 and hinge force mechanism 550 are housed within an interior region 1234 defined within frame 110-12 and temple portion 114L-12. However, hinge portions 540 and 542, and covers 522 and 524 are omitted from hinge assembly 1200. Cam 720 interfaces with one of frame 110-12 or temple portion 114L-12 (e.g., via hinge portion 1230) and hinge core 515 interfaces with another of frame 110-12 or temple portion 114L-12 (e.g., via hinge portion 1232). In at least some examples, hinge shaft 514 can be retained by and rotate relative to frame 110-12 and temple portion 114L-12 via bearings or receptacles indicated schematically at 1240 and 1242, respectively.

One or more flexible ribbon circuits 530 and 532 can electrically couple the previously described frame-based electronic subsystem 116 to the temple-based electronic subsystem 118L of FIG. 1. As depicted in FIGS. 12 and 13, flexible ribbon circuits 530 and 532 pass through the frame, spiral around the hinge core, and pass through the temple portion. In this example, flexible ribbon circuits 530 and 532 pass between the hinge core and interior walls of interior region 1234. A potential advantage of the configuration of FIGS. 12 and 13 is that covers spanning a length of the hinge axis may not be needed to suitably protect the hinge assembly from external contaminants. For example, an annular seal could be placed within horizontal interface to reduce or inhibit incursion of contaminants.

According to a disclosed example, an electronic eyewear device, comprises: a frame having a first electronic subsystem that includes a near-eye graphical display; a temple portion having a second electronic subsystem; and a hinge assembly rotatably coupling the frame to the temple portion, the hinge assembly including: a hinge core defining a hinge axis, a cover that spans a gap between the frame and the temple portion on at least one side of the hinge axis, and a flexible ribbon circuit electrically coupling the first electronic subsystem to the second electronic subsystem, wherein the flexible ribbon circuit spirals around the hinge core between the cover and the hinge core. In this example or other disclosed examples, the hinge core includes: a first hinge portion interfacing with the frame, a second hinge portion interfacing with the temple portion that is rotatable relative to the first hinge portion, and a hinge force mechanism coupling the first hinge portion to the second hinge portion that defines a varying rotational force profile across a range of rotation of the first hinge portion relative to the second hinge portion. In this example or other disclosed examples, the hinge force mechanism includes: a core body interfacing with one of the first hinge portion or the second hinge portion, a cam rotatable relative to the core body about the hinge axis and interfacing with another of the first hinge portion or the second hinge portion relative to the core body, a cam follower interfacing with the cam and rotatable relative to the core body about the hinge axis, and a spring interfacing with the cam follower and providing a spring force on the cam follower that opposes the cam. In this example or other disclosed examples, the spring forms at least one of a compression spring or a torsion spring. In this example or other disclosed examples, the varying rotational force profile provides a resistive rotational force within a first part of the range of rotation in a first direction, and provides a decreasing rotational force or an assistive rotational force within a second part of the range of rotation in the first direction. In this example or other disclosed examples, the cam follower and the spring are housed within an interior volume defined by the core body. In this example or other disclosed examples, the hinge core further includes a hinge axle orientated along the hinge axis; and the cam and the cam follower are carried upon and rotate about the hinge axle. In this example or other disclosed examples, the flexible ribbon circuit is a first flexible ribbon circuit of the hinge assembly; and the hinge assembly further includes a second flexible ribbon circuit electrically coupling the first electronic subsystem to the second electronic subsystem, wherein the second flexible ribbon circuit spirals around the hinge core between the first flexible ribbon circuit and the hinge core. In this example or other disclosed examples, one of the first or second flexible ribbon circuit is configured to convey electrical power from the second electronic subsystem of the temple portion to the first electronic subsystem of the frame; and wherein another of the first or the second flexible ribbon circuit is configured to convey a plurality of electrical signals in parallel between the second electronic subsystem of the temple portion and the first electronic subsystem of the frame. In this example or other disclosed examples, the second electronic subsystem of the temple portion includes a battery and a computing device. In this example or other disclosed examples, the cover includes an interior-side cover that spans the gap between the frame and the temple portion on a first side of the hinge axis; and the cover further includes an exterior-side cover that spans a gap between the frame and the temple portion on a second side of the hinge axis opposite the first side. In this example or other disclosed examples, at least one of the interior-side cover or the exterior-side cover is rotatable about the hinge axis relative to both the frame and the temple portion. In this example or other disclosed examples, at least one of the interior-side cover or the exterior-side cover that is rotatable about the hinge axis relative to both the frame and the temple portion includes two flanges at opposing edges of that cover that are parallel to the hinge axis and that respectively engage with corresponding flanges on each of the frame and the temple portion to limit rotation of that cover within a limited range about the hinge axis. In this example or other disclosed examples, the hinge assembly includes a hinge axle; and the interior-side cover and the exterior-side cover are coupled to the hinge axle.

According to another disclosed example, an electronic eyewear device comprises: a frame having a first electronic subsystem that includes a near-eye graphical display; a temple portion having a second electronic subsystem; and a hinge assembly rotatably coupling the frame to the temple portion about a hinge axis, the hinge assembly including: a cover assembly, including: an interior-side cover that spans a gap between the frame and the temple portion on a first side of the hinge axis, an exterior-side cover that spans a gap between the frame and the temple portion on a second side of the hinge axis opposite the first side, the interior-side cover and the exterior-side cover being rotatable about the hinge axis relative to both the frame and the temple portion, and a flexible ribbon circuit electrically coupling the first electronic subsystem to the second electronic subsystem, wherein the flexible ribbon circuit pass between the hinge core and the interior-side cover or the exterior-side cover. In this example or other disclosed examples, at least one of the interior-side cover or the exterior-side cover includes two flanges at opposing edges of that cover that are parallel to the hinge axis and that respectively engage with corresponding flanges on each of the frame and the temple portion to limit rotation of that cover within a limited range about the hinge axis. In this example or other disclosed examples, the interior-side cover forms a first arc segment that is curved about a first axis that is parallel to or colinear with the hinge axis; and wherein the exterior-side cover forms a second arc segment that is curved about a second axis that is parallel to or colinear with the hinge axis. In this example or other disclosed examples, the hinge assembly includes a hinge axle; and the interior-side cover and the exterior-side cover are coupled to the hinge axle.

According to another disclosed example, an electronic eyewear device comprises: a frame having a first electronic subsystem that includes a near-eye graphical display; a temple portion having a second electronic subsystem; and a hinge assembly rotatably coupling the frame to the temple portion about a hinge axis; wherein a distal end of the frame and a distal end of the temple portion overlap each other along the hinge axis; the hinge assembly including: a hinge core defining the hinge axis, and a flexible ribbon circuit electrically coupling the first electronic subsystem to the second electronic subsystem, wherein the flexible ribbon circuit passes through the frame, spirals around the hinge core, and passes through the temple portion. In this example or other disclosed examples, the hinge core includes: a first hinge portion interfacing with the frame, a second hinge portion interfacing with the temple portion that is rotatable relative to the first hinge portion, and a hinge force mechanism coupling the first hinge portion to the second hinge portion that defines a varying rotational force profile across a range of rotation of the first hinge portion relative to the second hinge portion.

It will be understood that the configurations and/or approaches described herein are exemplary in nature, and that these specific embodiments or examples are not to be considered in a limiting sense, because numerous variations are possible. The subject matter of the present disclosure includes all novel and non-obvious combinations and subcombinations of the various examples and configurations, and other features, functions, acts, and/or properties disclosed herein, as well as any and all equivalents thereof.

The invention claimed is:

1. An electronic eyewear device, comprising:
a frame having a first electronic subsystem that includes a near-eye graphical display;
a temple portion having a second electronic subsystem; and
a hinge assembly rotatably coupling the frame to the temple portion, the hinge assembly including:
a hinge core defining a hinge axis,
an interior-side cover that spans a gap between the frame and the temple portion on a first side of the hinge axis and that is rotatably coupled to the hinge core by a first retainer clip,
an exterior-side cover that spans a gap between the frame and the temple portion on a second side of the hinge axis opposite of the first side and that is rotatably coupled to the hinge core by a second retainer clip, and
a flexible ribbon circuit electrically coupling the first electronic subsystem to the second electronic subsystem, wherein the flexible ribbon circuit spirals around the hinge core.

2. The electronic eyewear device of claim 1, wherein the hinge core includes:
a first hinge portion interfacing with the frame,
a second hinge portion interfacing with the temple portion that is rotatable relative to the first hinge portion, and
a hinge force mechanism coupling the first hinge portion to the second hinge portion that defines a varying rotational force profile across a range of rotation of the first hinge portion relative to the second hinge portion.

3. The electronic eyewear device of claim 2, wherein the hinge force mechanism includes:
a core body interfacing with one of the first hinge portion or the second hinge portion,
a cam rotatable relative to the core body about the hinge axis and interfacing with another of the first hinge portion or the second hinge portion relative to the core body,
a cam follower interfacing with the cam and rotatable relative to the core body about the hinge axis, and
a spring interfacing with the cam follower and providing a spring force on the cam follower that opposes the cam.

4. The electronic eyewear device of claim 3, wherein the spring forms at least one of a compression spring or a torsion spring.

5. The electronic eyewear device of claim 3, wherein the varying rotational force profile provides a resistive rotational force within a first part of the range of rotation in a first direction, and provides a decreasing rotational force or an assistive rotational force within a second part of the range of rotation in the first direction.

6. The electronic eyewear device of claim 3, wherein the cam follower and the spring are housed within an interior volume defined by the core body.

7. The electronic eyewear device of claim 3, wherein the hinge core further includes a hinge axle orientated along the hinge axis; and
wherein the cam and the cam follower are carried upon and rotate about the hinge axle.

8. The electronic eyewear device of claim 1, wherein the flexible ribbon circuit is a first flexible ribbon circuit of the hinge assembly; and
wherein the hinge assembly further includes a second flexible ribbon circuit electrically coupling the first electronic subsystem to the second electronic subsystem, wherein the second flexible ribbon circuit spirals around the hinge core between the first flexible ribbon circuit and the hinge core.

9. The electronic eyewear device of claim 8, wherein one of the first or second flexible ribbon circuit is configured to convey electrical power from the second electronic subsystem of the temple portion to the first electronic subsystem of the frame; and
wherein another of the first or the second flexible ribbon circuit is configured to convey a plurality of electrical signals in parallel between the second electronic subsystem of the temple portion and the first electronic subsystem of the frame.

10. The electronic eyewear device of claim 1, wherein the second electronic subsystem of the temple portion includes a battery and a computing device.

11. The electronic eyewear device of claim 1, wherein at least one of the interior-side cover or the exterior-side cover is rotatable about the hinge axis relative to both the frame and the temple portion.

12. The electronic eyewear device of claim 1, wherein the at least one of the interior-side cover or the exterior-side cover that is rotatable about the hinge axis relative to both the frame and the temple portion includes two flanges at opposing edges of that cover that are parallel to the hinge axis and that respectively engage with corresponding flanges on each of the frame and the temple portion to limit rotation of that cover within a limited range about the hinge axis.

13. The electronic eyewear device of claim 1, wherein the hinge assembly includes a hinge axle; and
wherein the interior-side cover and the exterior-side cover are coupled to the hinge axle.

14. An electronic eyewear device, comprising:
a frame having a first electronic subsystem that includes a near-eye graphical display;
a temple portion having a second electronic subsystem; and
a hinge assembly rotatably coupling the frame to the temple portion about a hinge axis, the hinge assembly including:
a cover assembly, including:
an interior-side cover that spans a gap between the frame and the temple portion on a first side of the hinge axis and that is rotatably coupled to a hinge core by a first retainer clip,
an exterior-side cover that spans a gap between the frame and the temple portion on a second side of the hinge axis opposite the first side and that is rotatably coupled to the hinge core by a second retainer clip, the interior-side cover and the exterior-side cover being rotatable about the hinge axis relative to both the frame and the temple portion,
a cam and a cam follower arranged about the hinge axis, and
a flexible ribbon circuit electrically coupling the first electronic subsystem to the second electronic subsystem, wherein the flexible ribbon circuit pass between the hinge core and the interior-side cover or the exterior-side cover.

15. The electronic eyewear device of claim 14, wherein at least one of the interior-side cover or the exterior-side cover includes two flanges at opposing edges of that cover that are parallel to the hinge axis and that respectively engage with corresponding flanges on each of the frame and the temple portion to limit rotation of that cover within a limited range about the hinge axis.

16. The electronic eyewear device of claim 14, wherein the interior-side cover forms a first arc segment that is curved about a first axis that is parallel to or colinear with the hinge axis; and
wherein the exterior-side cover forms a second arc segment that is curved about a second axis that is parallel to or colinear with the hinge axis.

17. The electronic eyewear device of claim 14, wherein the hinge assembly includes a hinge axle; and
wherein the interior-side cover and the exterior-side cover are coupled to the hinge axle.

18. An electronic eyewear device, comprising:
a frame having a first electronic subsystem that includes a near-eye graphical display;
a temple portion having a second electronic subsystem; and
a hinge assembly rotatably coupling the frame to the temple portion about a hinge axis;
wherein a distal end of the frame comprises a first stepped profile and a distal end of the temple portion comprises a second stepped profile that overlaps with the first stepped profile of the distal end of the frame along the hinge axis;
the hinge assembly including:
a hinge core defining the hinge axis, and
a flexible ribbon circuit electrically coupling the first electronic subsystem to the second electronic subsystem, wherein the flexible ribbon circuit passes through the frame, spirals around the hinge core, and passes through the temple portion.

19. The electronic eyewear device of claim 18, wherein the hinge core includes:
a first hinge portion interfacing with the frame,
a second hinge portion interfacing with the temple portion that is rotatable relative to the first hinge portion, and
a hinge force mechanism coupling the first hinge portion to the second hinge portion that defines a varying rotational force profile across a range of rotation of the first hinge portion relative to the second hinge portion.

* * * * *